(12) United States Patent
Teranishi et al.

(10) Patent No.: US 8,508,467 B2
(45) Date of Patent: Aug. 13, 2013

(54) DISPLAY DEVICE AND ELECTRIC APPARATUS USING THE SAME

(75) Inventors: Tomoko Teranishi, Osaka (JP); Akio Miyata, Osaka (JP); Shinichi Nakano, Osaka (JP); Toshiki Matsuoka, Osaka (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 896 days.

(21) Appl. No.: 12/602,929

(22) PCT Filed: Jan. 16, 2008

(86) PCT No.: PCT/JP2008/050427
§ 371 (c)(1),
(2), (4) Date: Dec. 3, 2009

(87) PCT Pub. No.: WO2008/155925
PCT Pub. Date: Dec. 24, 2008

(65) Prior Publication Data
US 2010/0177022 A1 Jul. 15, 2010

(30) Foreign Application Priority Data
Jun. 19, 2007 (JP) ................................. 2007-161555

(51) Int. Cl.
*G09G 3/34* (2006.01)
(52) U.S. Cl.
USPC ................................ 345/107; 345/71; 345/72
(58) Field of Classification Search
USPC ............................................. 345/107, 71, 72
See application file for complete search history.

(56) References Cited

U.S. PATENT DOCUMENTS

| 7,224,510 | B2 * | 5/2007 | Kitano et al. ................. 359/296 |
| 7,872,790 | B2 * | 1/2011 | Steckl et al. .................. 359/253 |
| 2004/0196525 | A1 | 10/2004 | Fujii et al. |
| 2009/0034054 | A1 | 2/2009 | Ikegami et al. |
| 2009/0059348 | A1 | 3/2009 | Niwano et al. |
| 2009/0079689 | A1 | 3/2009 | Miyata et al. |

FOREIGN PATENT DOCUMENTS

| EP | 1 643 231 A1 | 4/2006 |
| JP | 2004-252444 A | 9/2004 |
| WO | WO-2006/129846 A1 | 12/2006 |
| WO | WO 2007/007879 A1 | 1/2007 |
| WO | WO-2007/013682 A1 | 2/2007 |

OTHER PUBLICATIONS

Mugele et al., "Electrowetting: from basics to applications," Journal of Physics: Condensed Matter, 2005, vol. 17, pp. R705-R774.*
Blankenbach et al. "Recent Improvements of Droplet-Driven Electrowetting Displays", SID 08 DIGEST, pp. 803-806, 2008.

* cited by examiner

*Primary Examiner* — Latanya Bibbins
(74) *Attorney, Agent, or Firm* — Birch, Stewart, Kolasch & Birch, LLP

(57) ABSTRACT

A display device (10) includes an upper substrate (first substrate) (2), a lower substrate (second substrate) (3), and a conductive liquid (16) that is movably sealed in a display space (S) formed between the upper substrate (2) and the lower substrate (3). In the display device (10), a signal electrode (first electrode) (4) is provided on the upper substrate (2), and a scanning electrode (second electrode) (5) and a reference electrode (third electrode) (6) are provided on the lower substrate (3). The signal electrode (4) comes into contact with the conductive liquid (16) and is made of a material that is electrochemically inert to the conductive liquid (16).

13 Claims, 8 Drawing Sheets

DISPLAY DEVICE AND ELECTRIC APPARATUS USING THE SAME

TECHNICAL FIELD

The present invention relates to a display device that displays information such as images and characters by moving a conductive liquid, and an electric apparatus using the display device.

BACKGROUND ART

In recent years, as typified by an electrowetting type display device, a display device that displays information by utilizing a transfer phenomenon of a conductive liquid due to an external electric field has been developed and put to practical use.

Specifically, the above conventional display device includes first and second electrodes, first and second substrates, and a colored droplet that is sealed in a display space formed between the first and second substrates and serves as a conductive liquid that is colored a predetermined color (see, e.g., JP 2004-252444A). In the conventional display device, a voltage is applied to the colored droplet via the first and second electrodes to change the shape of the colored droplet or to move the colored droplet, thereby changing the display color on a display surface.

The conventional display device also includes a third electrode made of a transparent electrode material such as ITO, similarly to the first and second electrodes, and thus promotes restoration of the colored droplet to a spherical shape, i.e., improves the response speed of the conductive liquid. In this manner, the conventional display device can display dynamic images.

DISCLOSURE OF INVENTION

Problem to be Solved by the Invention

In the above conventional display device, the response speed of the conductive liquid is improved by bringing at least one of the first to third electrodes into direct contact with the colored droplet (conductive liquid).

However, in the conventional display device, depending on the type of the conductive liquid or the materials of the electrodes, an electrochemical reaction between the conductive liquid and the electrodes may occur. Thus, when the response speed of the conductive liquid is improved, it can lead to low reliability or significantly short life of the conventional display device.

With the foregoing in mind, it is an object of the present invention to provide a long-life display device that can prevent a reduction in the reliability even if the responsibility of a conductive liquid is improved, and an electric apparatus using the display device.

Means for Solving Problem

To achieve the above object, a display device of the present invention includes a first substrate provided on a display surface side, a second substrate provided on a non-display surface side of the first substrate so that a predetermined display space is formed. between the first substrate and the second substrate, and a conductive liquid that is movably sealed in the display space. The display device is capable of changing a display color on the display surface side by moving the conductive liquid. The display device includes the following: a first electrode that is provided on one of the first substrate and the second substrate so as to come into contact with the conductive liquid; a second electrode that is provided on the other of the first substrate and the second substrate so as to be electrically insulated from the conductive liquid; and a third electrode that is provided on the other of the first substrate and the second substrate so as to be electrically insulated from the conductive liquid and the second electrode. The first substrate is made of a material that is electrochemically inert to the conductive liquid.

In the above display device, the first electrode is provided on one of the first and second substrates so as to come into contact with the conductive liquid and made of a material that is electrochemically inert to the conductive liquid. With this configuration, unlike the conventional example, it is possible to prevent the occurrence of an electrochemical reaction between the conductive liquid and the first electrode. Therefore, even if the responsibility of the conductive liquid is improved, the display device can prevent a reduction in the reliability and have a long life.

In the context of the present invention, the material that is electrochemically inert to the conductive liquid is defined as follows. When a predetermined voltage is applied to this material that is in contact with, but not electrically insulated from the conductive liquid, no electrochemical reaction (oxidation-reduction reaction) between the material and the conductive liquid occurs, and thus the material is not electrolyzed.

In the above display device, it is preferable that a plurality of the first electrodes are provided along a predetermined arrangement direction, that a plurality of the second electrodes and a plurality of the third electrodes are alternately arranged so as to intersect with the plurality of the first electrodes, that the plurality of the first electrodes are used as one of a plurality of signal electrodes and a plurality of scanning electrodes, that the plurality of the second electrodes are used as the other of the plurality of the signal electrodes and the plurality of the scanning electrodes, and that the plurality of the third electrodes are used as a plurality of reference electrodes. It is also preferable that the display device includes the following: a reference voltage application portion that is connected to the plurality of the reference electrodes and applies a predetermined reference voltage to each of the reference electrodes; a signal voltage application portion that is connected to the plurality of the signal electrodes and applies a signal voltage to each of the signal electrodes in accordance with information to be displayed on the display surface side; and a scanning voltage application portion that is connected to the plurality of the scanning electrodes and applies one of a non-selected voltage and a selected voltage to each of the scanning electrodes while the reference voltage application portion applies the reference voltage to each of the reference electrodes, the non-selected voltage inhibiting a movement of the conductive liquid in the display space and the selected voltage allowing the conductive liquid. to move in the display space in accordance with the signal voltage.

In this case, a long-life matrix-driven display device with excellent reliability can be provided.

In the above display device, a plurality of pixel regions may be provided on the display surface side, the plurality of the pixel regions may be located at each of the intersections of the signal electrodes and the scanning electrodes, and the display space in each of the pixel regions may be partitioned by a partition.

In this case, the display color on the display surface side can be changed for each pixel by moving the conductive liquid in each of the pixels on the display surface side.

In the above display device, the plurality of the pixel regions may be provided in accordance with a plurality of colors that enable full-color display to be shown on the display surface side.

In this case, the color image display can be performed by moving the corresponding conductive liquid properly in each of the pixels.

In the above display device, it is preferable that the signal voltage application portion changes the signal voltage based on an external image input signal.

In this case, the gradation display can be performed in accordance with the image input signal for each of the pixels, and thus the display device can have excellent display performance.

In the above display device, it is preferable that an insulating fluid that is not mixed with the conductive liquid is movably sealed in the display space.

In this case, the speed of movement of the conductive liquid can be easily improved.

In the above display device, it is preferable that a dielectric layer is formed on the surfaces of the second electrode and the third electrode.

In this case, the dielectric layer ensures that the electric field applied to the conductive liquid is increased, so that the speed of movement of the conductive liquid can be more easily improved.

In the above display device, the first substrate and the second substrate may be made of a transparent sheet material, and a backlight may be provided on the back of the second substrate.

In this case, since the display operation is performed using the illumination light emitted from the backlight, a proper display operation can be performed even with insufficient ambient light or at nighttime. Moreover, this configuration can easily provide a high brightness display device that has a large dimming range and is readily capable of performing a high precision gradation control.

In the display device, the first substrate may be made of a transparent sheet material, and the second substrate may be provided with a light reflection portion.

In this case, since the light reflection portion reflects the externally incident ambient light so as to perform the display operation, this configuration can easily provide a thin and an electric power-saving display device.

In the above display device, the first substrate may be made of a transparent sheet material, the second substrate may be provided with a light reflection portion and a transparent portion that are arranged side by side, and a backlight may be provided on the back of the light reflection portion and the transparent portion.

In this case, since the display operation is performed using the ambient light reflected by the light reflection portion and the illumination light emitted from the backlight, this configuration can easily provide a high brightness display device that has a large dimming range and is readily capable of performing a high precision gradation control while reducing the power consumption of the backlight.

In the above display device, it is preferable that the conductive liquid is an aqueous solution including water as a solvent and a predetermined electrolyte as a solute.

In this case, the display device can have excellent handling properties and also be easily produced.

In the above display device, the first electrode may be in a passive state including an electrode body composed of a conductive metal and an oxide film disposed to cover the surface of the electrode body.

In this case, it is possible to reliably prevent an electrochemical reaction between the first electrode and the conductive liquid, and also to easily prevent a reduction in the reliability of the display device.

In the above display device, the first electrode may include at least one selected from the group consisting of gold, silver, copper, platinum, and palladium.

In this case, since the metals having a low ionization tendency are used for the first electrode, it is possible not only to simplify the first electrode, but also to reliably prevent an electrochemical reaction between the first electrode and the conductive liquid. Thus, the display device can easily prevent a reduction in the reliability and have a long life. Moreover, the interfacial tension at the interface between the first electrode and the conductive liquid can be relatively small. Therefore, when the conductive liquid is not moved, it can be easily held in a stable state at the fixed position.

In the above display device, at least one of the second electrode and the third electrode may be a transparent electrode, and a shape of the first electrode may be determined using a transmittance of the transparent electrode.

In this case, even if the first electrode is made of an opaque material, it is possible to suppress a decrease in display quality due to the first electrode.

In the above display device, the first electrode may be linear wiring

In this case, even if the first electrode is made of an opaque material, it is possible to reliably suppress a decrease in display quality clue to the first electrode.

An electric apparatus of the present invention includes a display portion that displays information including characters and images. The display portion includes any of the above display devices.

In the electric apparatus having the above configuration, the display portion uses the display device that can prevent a reduction in the reliability and have a long life even if the responsibility of the conductive liquid is improved. Thus, the electric apparatus that includes the long-life display portion with excellent reliability and display performance can be easily provided.

Effects of the Invention

The present invention can provide a long-life display device that can prevent a reduction in the reliability even if the responsibility of a conductive liquid is improved, and an electric apparatus using the display device.

DESCRIPTION OF THE INVENTION

Figure 1:
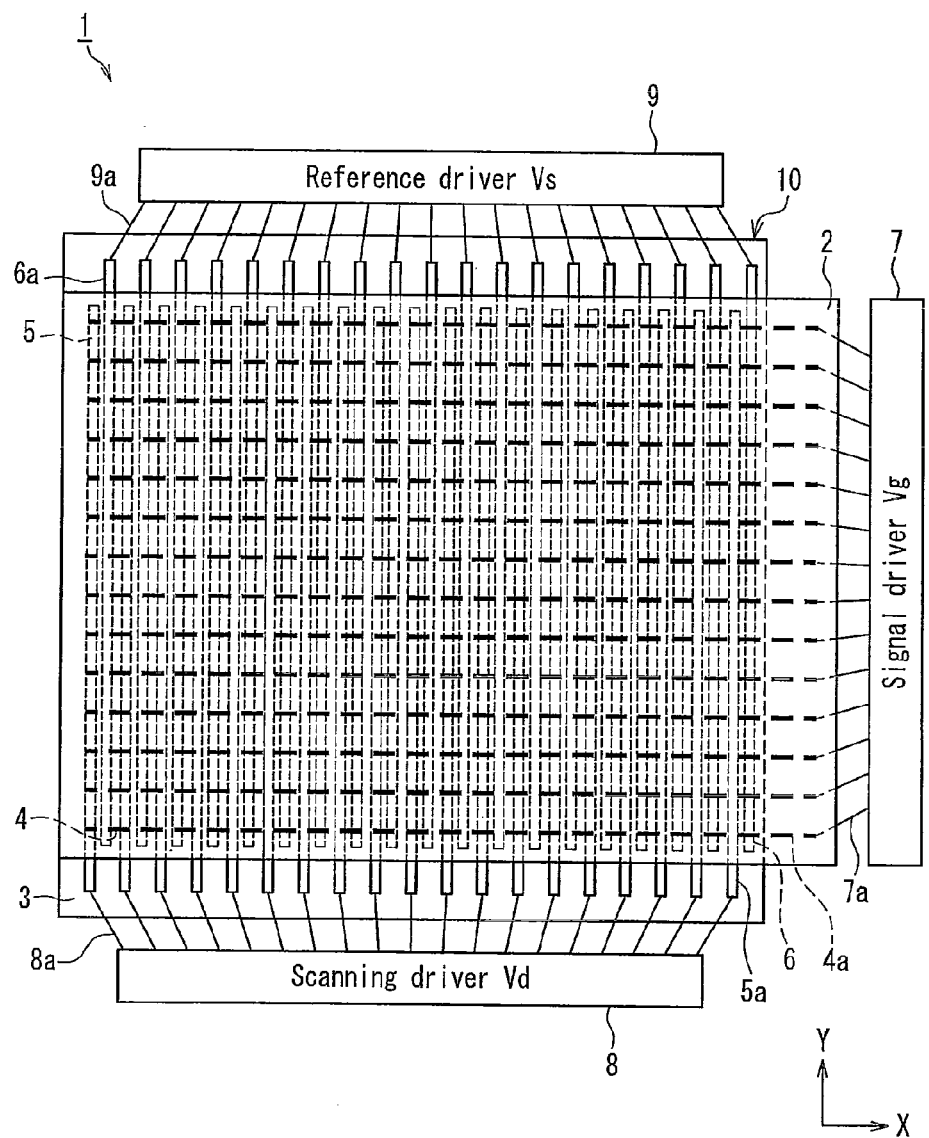
FIG. 1 is plan view for explaining a display device and an image display apparatus of Embodiment 1 of the present invention.

Hereinafter, preferred embodiments of a display device and an electric apparatus of the present invention will be described with reference to the drawings.

In the following description, the present invention is applied to an image display apparatus including a display portion that can display color images. The size and size ratio of each of the constituent members in the drawings do not exactly reflect those of the actual constituent members.

[Embodiment]1

FIG. 1 is a plan view for explaining a display device and an image display apparatus of Embodiment 1 of the present invention. In FIG. 1, an image display apparatus 1 of this embodiment includes a display portion using a display device 10 of the present invention. The display portion has a rectangular display surface. The display device 10 includes an upper substrate 2 and a lower substrate 3 that are arranged to overlap each other in the direction perpendicular to the sheet of FIG. 1. The overlap between the upper substrate 2 and the lower substrate 3 forms an effective display region of the display surface.

In the display device 10, a plurality of signal electrodes 4 are spaced at predetermined intervals and arranged in stripes in the X direction. Moreover, in the display device 10, a plurality of scanning electrodes 5 and a plurality of reference electrodes 6 are alternately arranged in stripes in the Y direction. The signal electrodes 4 intersect with the scanning electrodes 5 and the reference electrodes 6, and a plurality of pixel regions are located at each of the intersections of the signal electrodes 4 and the scanning electrodes 5.

In the display device 10, the pixel regions are separated from one another by partitions and provided in accordance with a plurality of colors that enable full-color display to be shown on the display surface. The display device 10 changes the display color on the display surface by moving a conductive liquid (as will be described later) for each of a plurality of pixels (display cells) arranged in a matrix using an electrowetting phenomenon.

One end of the signal electrodes 4, the scanning electrodes 5, and the reference electrodes 6 are extended to the outside of the effective display region of the display surface and form terminals 4a, 5a, and 6a, respectively.

A reference driver 9 is connected to the individual terminals 6a of the reference electrodes 6 via wires 9a. The reference driver 9 constitutes a reference voltage application portion and applies a predetermined reference voltage Vs to each of the reference electrodes 6 at all times when the image display apparatus 1 displays the information including characters and images on the display surface.

A signal driver 7 is connected to the individual terminal 4a of the signal electrodes 4 via wires 7a. The signal driver 7 constitutes a signal voltage application portion and applies a signal voltage Vg to each of the signal electrodes 4 in accordance with information when the image display apparatus 1 displays the information including characters and images on the display surface.

A scanning driver 8 is connected to the individual terminals 5a of the scanning electrodes 5 via'wires 8a. The scanning driver 8 constitutes a scanning voltage application portion and applies a scanning voltage Vd to each of the scanning electrodes 5 when the image display apparatus 1 displays the information including characters and images on the display surface.

The scanning driver 8 applies either a non-selected voltage or a selected voltage to each of the scanning electrodes 5 as the scanning voltage Vd while the reference driver 9 applies the reference voltage Vs to each of the reference electrodes 6. The non-selected voltage inhibits the movement of the conductive liquid and the selected voltage allows the conductive liquid to move in accordance with the signal voltage Vg. In the image display apparatus 1, the scanning driver 8 applies the selected voltage to each of the scanning electrodes 5 in sequence, e.g., from the left to the right of FIG. 1, thereby performing a scanning operation for each line (which will be described in detail later).

The signal driver 7, the scanning driver 8, and the reference driver 9 include a direct-current power supply or an alternating-current power supply that supplies the signal voltage Vg, the scanning voltage Vd, and the reference voltage Vs, respectively.

The reference driver 9 switches the polarity of the reference voltage Vs at predetermined time intervals. Moreover, the scanning driver 8 switches the polarity of each of the scanning voltages Vd (i.e., the non-selected voltage and the selected voltage) in accordance with the switching of the polarity of the reference voltage Vs. Thus, since the polarities of the reference voltage Vs and the scanning voltage Vd are switched at predetermined time intervals, the localization of charges in the reference electrodes 6 and the scanning electrodes 5 can be prevented, compared to the case where the voltages with the same polarity are always applied to the reference electrodes 6 and the scanning electrodes 5. Moreover, it is possible to prevent the adverse effects of a display failure (after-image phenomenon) and low reliability (a reduction in life) due to the localization of charges.

The pixel structure of the display device 10 will be described in detail with reference to FIGS. 2 to 4 as well as FIG. 1.

Figure 2:
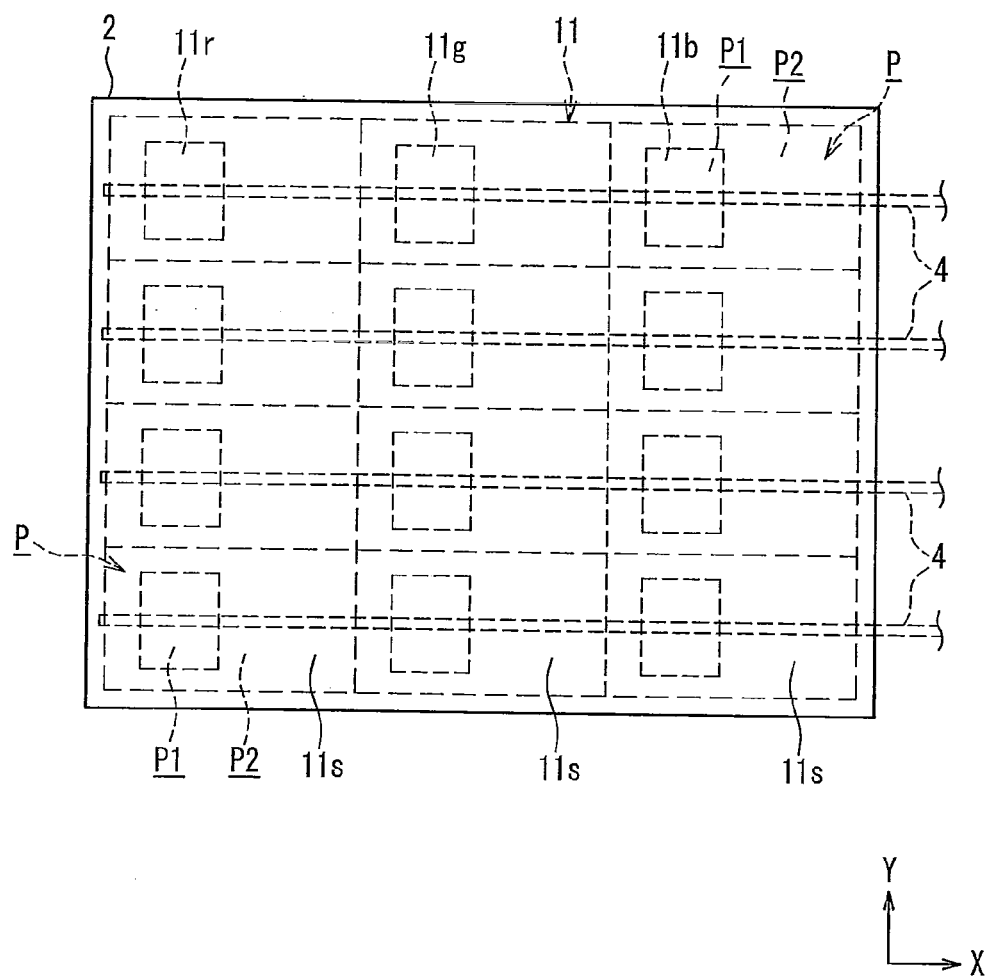
FIG. 2 is an enlarged plan view showing the main configuration of the upper substrate in FIG. 1 when viewed from a display surface side.

FIG. 2 is an enlarged. plan view showing the main configuration of the upper substrate in FIG. 1 when viewed from the display surface side. FIG. 3 is an enlarged plan view showing the main configuration of the lower substrate in FIG. 1 when viewed from the non-display surface side. FIGS. 4A and 4B are cross-sectional views showing the main configuration of the display device in FIG. 1 during non-CF color display and CF color display, respectively. For the sake of simplification, FIGS. 2 and 3 show twelve pixels placed at the upper left corner of the plurality of pixels on the display surface in FIG. 1.

Figure 3:
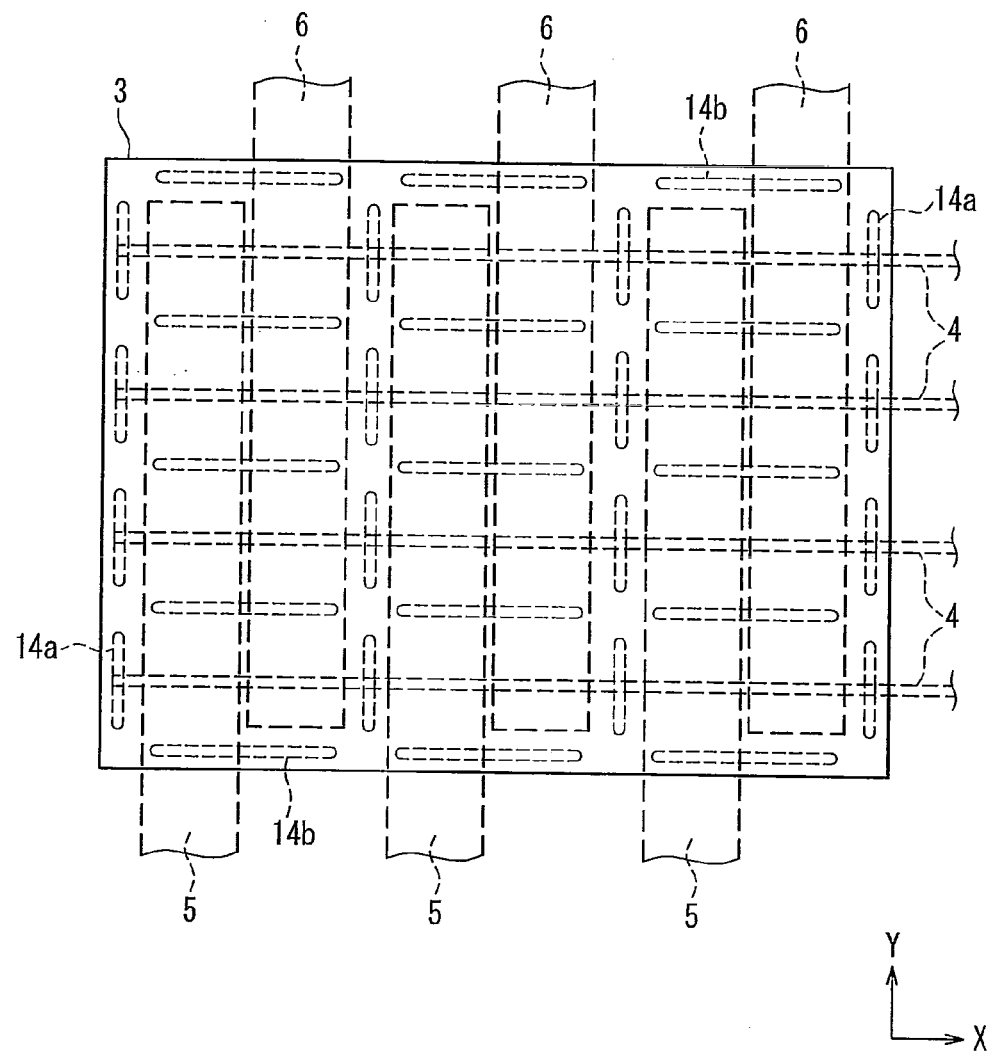
FIG. 3 is an enlarged plan view showing the main configuration of the lower substrate in FIG. 1 when viewed from a non-display surface side.
Figure 4A:
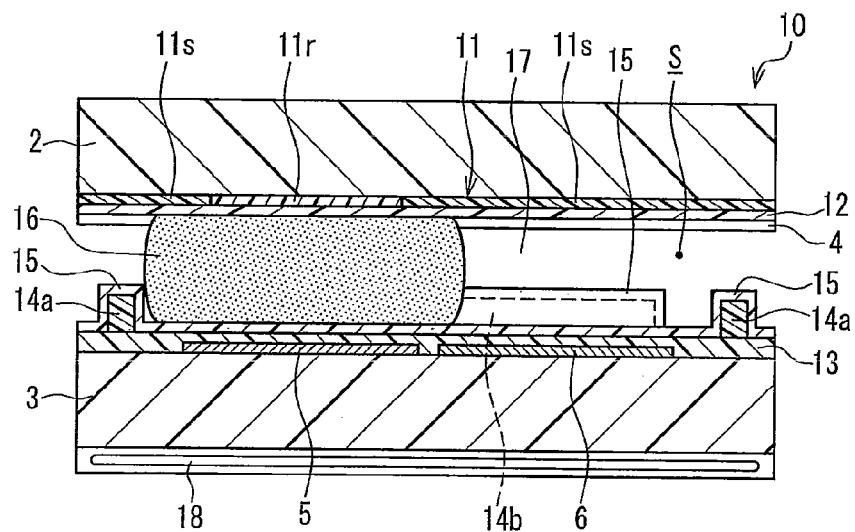
FIGS. 4A and 4B are cross-sectional views showing the main configuration of the display device in FIG. 1 during non-CF color display and CF color display, respectively.
Figure 4B:
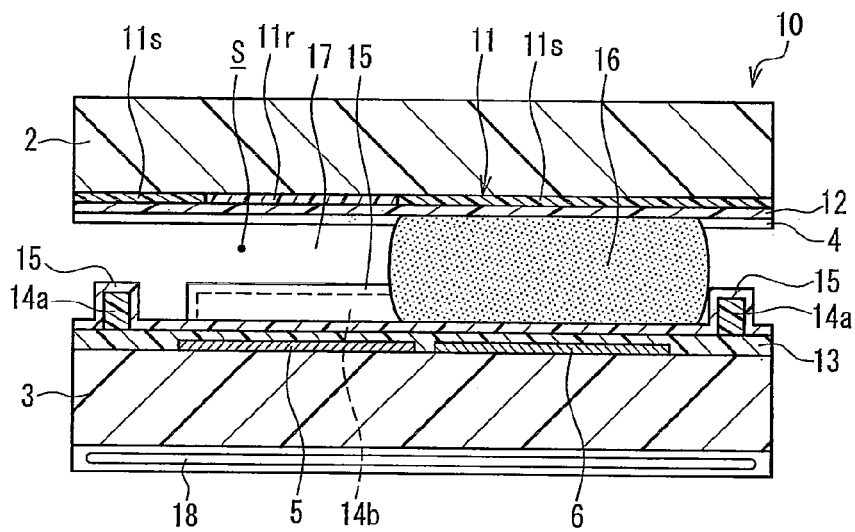

In FIGS. 2 to 4, the display device 10 includes the upper substrate 2 that is provided on the display surface side and serves as a first substrate, and the lower substrate 3 that is provided on the back (i.e., the non-display surface side) of the upper substrate 2 and serves as a second substrate. In the display device 10, the upper substrate 2 and the lower substrate 3 are located at a predetermined distance away from each other, so that a predetermined display space S is formed between the upper substrate 2 and the lower substrate 3. The conductive liquid 16 and an insulating oil 17 that is not mixed with the conductive liquid 16 are movably sealed in the display space S.

The conductive liquid 16 can be, e.g., an aqueous solution including water as a solvent and a predetermined electrolyte as a solute. Specifically, 1 mmol/L of potassium chloride (KCl) aqueous solution may be used as the conductive liquid 16. Moreover, the conductive liquid 16 is colored black with a dye or pigment and functions as a shutter that allows or prevents light transmission When the conductive liquid 16 is slidably moved in the display space S toward the scanning electrode 5 or the reference electrode 6, the display color of each pixel of the display device 10 is changed to black or any color of RBG, as will be described in detail later.

The oil 17 can be, e.g., a nonpolar, colorless, and transparent oil including one or more than one selected from a side-chain higher alcohol, a side-chain higher fatty acid, an alkane hydrocarbon, a silicone oil, and a matching oil. The oil 17 is shifted in the display space S as the conductive liquid 16 is slidably moved.

The upper substrate 2 can be, e.g., a transparent glass material such as a non-alkali glass substrate or a transparent sheet material such as a transparent synthetic resin (e.g., an acrylic resin). A color filter layer 11 and a hydrophobic film 12 are formed in this order on the surface of the upper substrate 2 that faces the non-display surface side. Moreover, the signal electrodes 4 serving as first electrodes are provided on the hydrophobic film 12.

Like the upper substrate 2, the lower substrate 3 can be, e.g., a transparent glass material such as a non-alkali glass substrate or a transparent sheet material such as a transparent synthetic resin (e.g., an acrylic resin). The scanning electrodes 5 serving as second electrodes and the reference electrodes 6 serving as third electrodes are provided on the surface of the lower substrate 3 that faces the display surface side. Moreover, a dielectric layer 13 is formed to cover the scanning electrodes 5 and the reference electrodes 6. Ribs 14a and 14b are formed parallel to the Y direction and the X direction, respectively, on the surface of the dielectric layer 13 that faces the display surface side. In the lower substrate 3, a hydrophobic film 15 is further formed to cover the dielectric layer 13 and the ribs 14a, 14b.

A backlight 18 that emits, e.g., white illumination light is integrally attached to the back (i.e., the non-display surface side) of the lower substrate 3, thus providing a transmission type display device 10.

The color filter layer 11 includes red (R), green (G), and blue (B) color filters 11r, 11g, and 11b and a black matrix 11s serving as a light-shielding layer, thereby constituting the pixels of R, G, and B colors. In the color filter layer 11, as shown in FIG. 2, the R, G, and B color filters 11r, 11g, and 11b are successively arranged in columns in the X direction, and each column includes four color filters in the Y direction. Thus, a total of twelve pixels are arranged in three columns (the X direction) and four rows (the Y direction).

As shown in FIG. 2, in each of the pixel regions P of the display device 10, any of the R, G, and B color filters 11r, 11g, and 11b is provided in a portion corresponding to the effective display region (aperture) P1 and the black matrix 11s is provided in a portion corresponding to the non-effective display region (non-aperture region) P2 of the pixel. In the display device 10, the area of each of the color filters 11r, 11g, and 11b is the same as or slightly larger than that of the effective display region P1. On the other hand, the area of the black matrix 11s is the same as or slightly smaller than that of the non-effective display region P2. In FIG. 2, the boundary between two black matrixes 11s corresponding to the adjacent pixels is indicated by a dotted line to clarify the boundary between the adjacent pixels. Actually, however, no boundary is present between the black matrixes 11s of the color filter layer 11.

In the display device 10, the display space S is divided into the pixel regions P by the ribs 14a, 14b serving as the partitions as described above. Specifically, as shown in FIG. 3, the display space S of each pixel is partitioned by two opposing ribs 14a and two opposing ribs 14b. Moreover, in the display device 10, the ribs 14a, 14b prevent the conductive liquid 16 from flowing into the display space S of the adjacent pixel regions P. The ribs 14a, 14b are made of, e.g., a light-curing resin, and the height of the ribs 14a, 14b protruding from the dielectric layer 13 is determined so as to prevent the flow of the conductive liquid 16 between the adjacent pixels.

Other than the above description, e.g., frame-shaped ribs may be formed for each pixel on the lower substrate 3 instead of the ribs 14a, 14b. Moreover, the top of the frame-shaped ribs may be brought into dose contact with the upper substrate 2 so that the adjacent pixel regions P are hermetically separated from one another.

The hydrophobic films 12, 15 are made of, e.g., a transparent synthetic resin, and preferably a fluorocarbon resin that functions as a hydrophilic layer for the conductive liquid 16 when a voltage is applied. This can significantly change the wettability (contact angle) between the conductive liquid 16 and each of the surfaces of the upper and lower substrates 2, 3 that face the display space S. Thus, the speed of movement of the conductive liquid 16 can be improved. The dielectric layer 13 can be, e.g., a transparent high-dielectric film containing parylene or alumina The scanning electrodes 5 and the reference electrodes 6 are made of, e.g., transparent electrode materials such as indium oxides (ITO), tin oxides ($SnO_2$), and zinc oxides (AZO, GZO, or IZO). The scanning electrodes 5 and the reference electrodes 6 are formed in stripes on the lower substrate 3 by a known film forming method such as sputtering.

The signal electrodes 4 can be, e.g., linear wiring that is arranged parallel to the X direction. The signal electrodes 4 are placed on the hydrophobic film 12 so as to extend substantially through the center of each of the pixel regions P in the Y direction, and further to come into direct contact with the conductive liquid 16 by passing through the conductive liquid 16. This can improve the responsibility of the conductive liquid 16 during a display operation.

A transparent hydrophobic film (not shown) made of, e.g., a fluorocarbon resin is formed on the surfaces of the signal electrodes 4 and functions as a hydrophilic layer for the conductive liquid 16 when a voltage is applied, thereby allowing the conductive liquid 16 to move smoothly. This hydrophobic film does not electrically insulate the signal electrodes 4 from the conductive liquid 16, and therefore not interfere with the improvement in responsibility of the conductive liquid 16.

Other than the above description, the color filter layer 11, the signal electrodes 4, and the hydrophobic film 12 may be formed in this order on the surface of the upper substrate 2 that faces the non-display surface side.

A material that is electrochemically inert to the conductive liquid 16 is used for the signal electrodes 4. Thus, even if the signal voltage Vg (e.g., 40 V) is applied to the signal electrodes 4, the electrochemical reaction between the signal electrodes 4 and the conductive liquid 16 can be minimized.

Specifically, the signal electrodes 4 are made of, e.g., an electrode material including at least one of gold, silver, copper, platinum, and palladium. The signal electrodes 4 may be formed by fixing thin wires made of the above metal material to the color filter layer 11 or mounting an ink material such as a conductive paste including the above metal material on the color filter layer 11 with screen printing or the like.

The shape of the signal electrodes 4 is determined using the transmittance of the scanning electrodes 5 located below the effective display region P1 of the pixels. Specifically, based on a transmittance of about 75% to 95% of the scanning electrodes 5, the shape of the signal electrodes 4 is determined so that the occupation area of the signal electrode 4 on the effective display region P1 is 30% or less, preferably 10% or less, and more preferably 5% or less of the area of the effective display region P1.

In each pixel of the display device 10 having the above configuration, as shown in FIG. 4A, when the conductive liquid 16 is held between the color filter 11r and scanning electrode 5, light from the backlight 18 is blocked by the conductive liquid 16, so that the black display (non-CF color display) is performed. On the other hand, as shown in FIG. 4B, when the conductive liquid 16 is held between the black matrix 11s and the reference electrode 6, light from the backlight 18 is not blocked by the conductive liquid 16 and passes through the color filter 11r, so that the red display (CF color display) is performed.

Hereinafter, a display operation of the image display apparatus 1 of this embodiment having the above configuration will be described in detail with reference to FIG. 5 as well as FIGS. 1 to 4.

Figure 5:
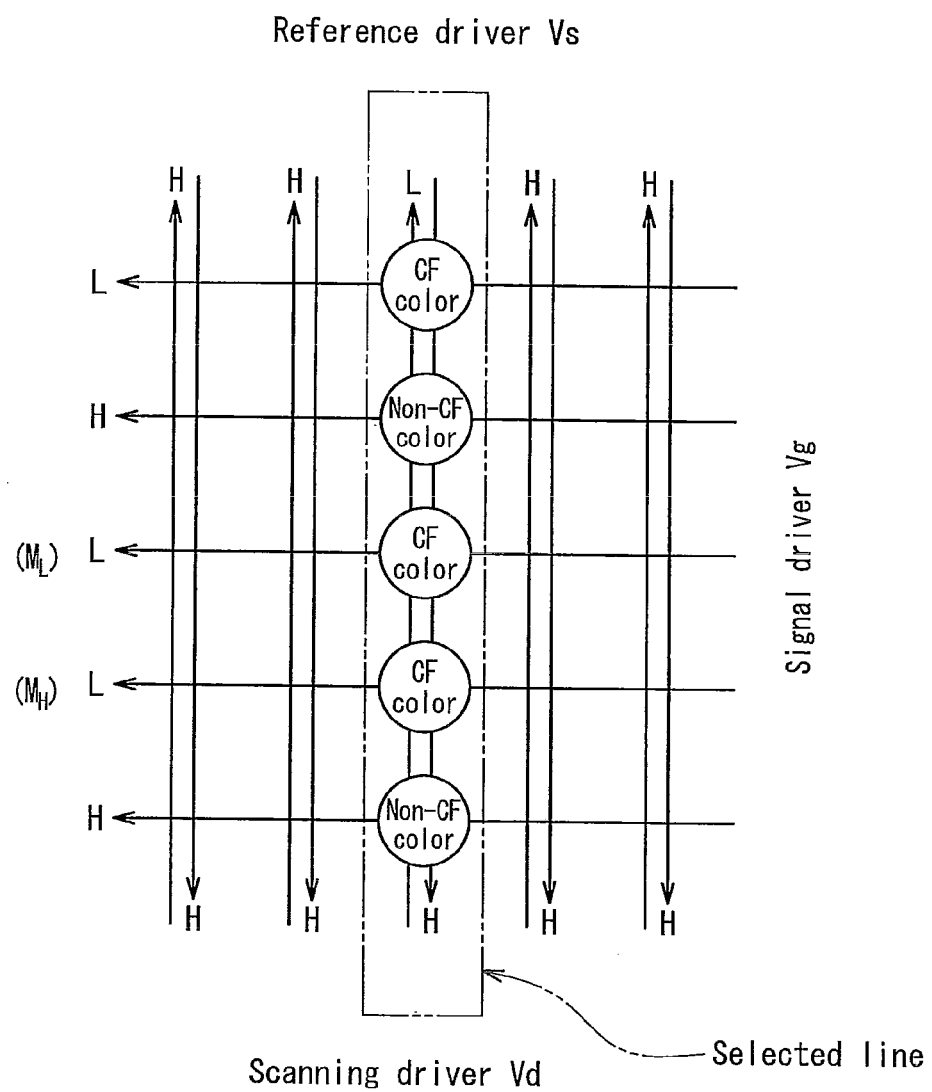
FIG. 5 is a diagram for explaining an operation example of the image display apparatus.

FIG. 5 is a diagram for explaining an operation example of the image display apparatus.

For example, voltages are applied to the reference electrodes 6, the scanning electrodes 5, and the signal electrodes 4 in the following manner. The reference driver 9 always applies a High voltage (i.e., the reference voltage Vs) to the reference electrodes 6. The scanning driver 8 determines a selected line by applying a Low voltage (i.e., the selected voltage) to the scanning electrodes 5 one by one from the left to the right of FIG. 1, and thus performs a scanning operation. Moreover, the scanning driver 8 determines non-selected lines by applying a High voltage (i.e., the non-selected voltage) to all the remaining scanning electrodes 5 to which the Low voltage has not been applied. The signal driver 7 applies a High or Low voltage (i.e., the signal voltage Vg) to the signal electrodes 4 in accordance with the external image input signal.

Table 1 shows the combinations of the voltages applied to the reference electrodes 6, the scanning electrodes 5, and the signal electrodes 4 in the above display operation. As shown in Table 1, the behavior of the conductive liquid 16 and the display color on the display surface depend on the applied voltages. In Table 1, the High voltage and the Low voltage are abbreviated to "H" and "L", respectively (the same is true for the following table).

TABLE 1

| | Reference electrode | Signal electrode | Scanning electrode | Behavior of conductive liquid and display color on display surface |
|---|---|---|---|---|
| Selected line | H | H | L | The conductive liquid is moved toward the scanning electrode. Black display |
| | | L | | The conductive liquid is moved toward the reference electrode. CF color display |
| Non-selected line | | H | H | The conductive liquid is still (not moving). Black or CF color display |
| | | L | | |

<Selected Line Operation>

In the selected line, e.g., when the High voltage is applied to the signal electrodes 4, there is no potential difference between the reference electrode 6 and the signal electrodes 4 because the High voltage is applied to both of these electrodes. On the other hand, a potential difference between the signal electrodes 4 and the scanning electrode 5 occurs because the Low voltage is applied to the scanning electrode 5. Therefore, the conductive liquid 16 is moved in the display space S toward the scanning electrode 5 that makes a potential difference from the signal electrodes 4. Consequently, the conductive liquid 16 is positioned as shown in FIG. 4A and prevents the illumination light emitted from the backlight 18 from reaching the color filter 11r. Thus, the display color on the display surface becomes black display (i.e., the non-CF color display) due to the presence of the conductive liquid 16.

In the selected line, when the Low voltage is applied to the signal electrodes 4, a potential difference occurs between the reference electrode 6 and the signal electrodes 4, but not between the signal electrodes 4 and the scanning electrode 5. Therefore, the conductive liquid 16 is moved in the display space S toward the reference electrode 6 that makes a potential difference from the signal electrodes 4. Consequently, the conductive liquid 16 is positioned as shown in FIG. 4B and allows the illumination light emitted from the backlight 18 to reach the color filter 11r by shifting the oil 17 toward the scanning electrode 5. Thus, the display color on the display surface becomes red display (i.e., the CF color display) due to the color filter 11r. In the image display apparatus 1, when the CF color display is performed in all the three adjacent R, G, and B pixels as a result of the movement of the conductive liquid 16 toward the reference electrode 6, the red, green, and blue colors of light from the corresponding R, G, and B pixels are mixed into white light, resulting in the white display.

<Non-selected Line Operation>

In the non-selected lines, e.g., when the High voltage is applied to the signal electrodes 4, there is no potential difference among the reference electrodes 6, the signal electrodes 4, and the scanning electrodes 5 because the High voltage is applied to all of these electrodes. Therefore, the conductive liquid 16 stays in the same position, i.e., it is not moving from the scanning electrode 5 side or the reference electrode 6 side, but stands still. Consequently, the display color is maintained without changing from the black display or the CF color display in the current state.

Similarly, in the non-selected lines, even when the Low voltage is applied to the signal. electrodes 4, the conductive liquid 16 stands still in the same position, and the current display color is maintained. Since the High voltage is applied to both the reference electrodes 6 and the scanning electrodes 5, the potential difference between the reference electrodes 6 and the signal electrodes 4 is the same as that between the scanning electrodes 5 and the signal electrodes 4.

As described above, in the non-selected lines, the conductive liquid 16 is not moved, but stands still and the display color on the display surface is unchanged regardless of whether the High or Low voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1, depending on the combinations of the applied voltages in Table 1, the display color each of the pixels on the selected line can be, e.g., the CF colors (red, green, or blue) produced by the color filters 11r, 11g, and 11b or the non-CF color (black) due to the conductive liquid 16 in accordance with the voltage applied to the signal electrodes 4 corresponding to the individual pixels, as shown in FIG. 5. When the scanning driver 8 performs a scanning operation, e.g., by determining the selected line of the scanning electrode 5 from the left to the right of FIG. 5, the display color each of the pixels in the display portion of the image display apparatus 1 also are changed in sequence from the left to the right of FIG. 5. Therefore, if the scanning driver 8 performs the scanning operation at a high speed, the display color each of the pixels in the display portion of the image display apparatus 1 also can be changed at a high speed. Moreover, by applying the signal voltage Vg to the signal electrodes 4 in synchronization with the scanning operation of the selected line, the image display apparatus 1 can display various information including dynamic images based on the external image input signal.

The combinations of the voltages applied to the reference electrodes 6, the scanning electrodes 5, and the signal electrodes 4 are not limited to Table 1, and may be as shown in Table 2.

TABLE 2

| | Reference electrode | Signal electrode | Scanning electrode | Behavior of conductive liquid and display color on display surface |
|---|---|---|---|---|
| Selected line | L | L | H | The conductive liquid is moved toward the scanning electrode. Black display |
| | | H | | The conductive liquid is moved toward the reference electrode. CF color display |
| Non-selected line | | L H | L | The conductive liquid is still (not moving). Black or CF color display |

The reference driver 9 always applies a Low voltage (i.e., the reference voltage Vs) to the reference electrodes 6. The scanning driver 8 determines a selected line by applying a High voltage (i.e., the selected voltage) to the scanning electrodes 5 one by one from the left to the right of FIG. 1, and thus performs a scanning operation. Moreover, the scanning driver 8 determines non-selected lines by applying a Low voltage (i.e., the non-selected voltage) to all the remaining scanning electrodes 5 to which the High voltage has not been applied. The signal driver 7 applies a High or Low voltage (i.e., the signal voltage Vg) to the signal electrodes 4 in accordance with the external image input signal.

<Selected Line Operation>

In the selected line, e.g., when the Low voltage is applied to the signal electrodes 4, there is no potential difference between the reference electrode 6 and the signal electrodes 4 because the Low voltage is applied to both of these electrodes. On the other hand, a potential difference between the signal electrodes 4 and the scanning electrode 5 occurs because the High voltage is applied to the scanning electrode 5. Therefore, the conductive liquid 16 is moved in the display space S toward the scanning electrode 5 that makes a potential difference from the signal electrodes 4. Consequently, the conductive liquid 16 is positioned as shown in FIG. 4A, and the display color on the display surface becomes black display (i.e., the non-CF color display) due to the presence of the conductive liquid 16.

In the selected line, when the High voltage is applied to the signal electrodes 4, a potential difference occurs between the reference electrode 6 and the signal electrodes 4, but not between the signal electrodes 4 and the scanning electrode 5. Therefore, the conductive liquid 16 is moved in the display space S toward the reference electrode 6 that makes a potential difference from the signal electrodes 4. Consequently, the conductive liquid 16 is positioned as shown in FIG. 4B, and the display color on the display surface becomes red display (i.e., the CF color display) due to the color filter 11r. Like Table 1, when the CF color display is performed in all the three adjacent R, G, and B pixels, the white display is performed.

<Non-selected Line Operation>

In the non-selected lines, e.g., when the Low voltage is applied to the signal electrodes 4, there is no potential differences among the reference electrodes 6, the signal electrodes 4, and the scanning electrodes 5 because the Low voltage is applied to all of these electrodes. Therefore, the conductive liquid 16 stays in the same position, i.e., it is not moving from the scanning electrode 5 side or the reference electrode 6 side, but stands still. Consequently, the display color is maintained without changing from the black display or the CF color display in the current state.

Similarly, in the non-selected lines, even when the High voltage is applied to the signal electrodes 4, the conductive liquid 16 stands still in the same position, and the current display color is maintained. Since the Low voltage is applied to both the reference electrodes 6 and the scanning electrodes 5, the potential difference between the reference electrodes 6 and the signal electrodes 4 is the same as that between the scanning electrodes 5 and the signal electrodes 4.

Like Table 1, in the non-selected lines shown in Table 2, the conductive liquid 16 is not moved, but stands still and the display color on the display surface is unchanged regardless of whether the High or Low voltage is applied to the signal electrodes 4.

On the other hand, in the selected line, the conductive liquid 16 can be moved in accordance with the voltage applied to the signal electrodes 4, as described above, and the display color on the display surface can be changed accordingly.

In the image display apparatus 1 of this embodiment, other than the combinations of the applied voltages shown in Tables 1 and 2, the voltage applied to the signal electrodes 4 may be changed in multiple stages, e.g., by setting the following Mid (Low) voltage or Mid (High) voltage in addition to the two values of the High voltage and the Low voltage.

<Mid (Low) Voltage Application Operation>

As shown in FIG. 5, as a Mid (Low) voltage that is between the High voltage and the Low voltage and is closer to the Low voltage (referred to as "ML voltage" in the following), e.g., an ML voltage ($=\frac{1}{3} \times$(High voltage−Low voltage)+Low voltage) is applied to the middle signal electrode 4. In this case, the potential difference between the reference electrode 6 and the signal electrode 4 is smaller for the ML voltage than for the Low voltage. Therefore, the amount of movement of the conductive liquid 16 toward the reference electrode 6 is smaller in the pixel where the ML voltage is applied to the signal electrode 4 than in the pixel where the Low voltage is applied to the signal electrode 4. Thus, the display color of the pixel in which the ML voltage is applied can be a color that is between the black display and the CF color display.

<Mid (High) Voltage Application Operation>

As a Mid (High) voltage that is between the High voltage and the Low voltage and is closer to the High voltage (referred to as "MEI voltage" in the following), e.g., an MH voltage ($=\frac{2}{3} \times$(High voltage−Low voltage)+Low voltage) is applied to the second signal electrode 4 from the bottom of FIG. 5. In this case, the potential difference between the reference electrode 6 and the signal electrode 4 is smaller for the MH voltage than for the ML voltage. Therefore, the amount of movement of the conductive liquid 16 toward the reference electrode 6 is smaller in the pixel where the MH voltage is applied to the signal electrode 4 than in the pixel where the ML voltage is applied to the signal electrode 4. Thus, the display color of the pixel in which the MH voltage is applied can be a color that is further between the intermediate color display at the time of applying the ML voltage and the black display. Particularly in this case, the relationship between the potential difference (=High voltage−MH voltage) between the reference electrode 6 and the signal electrode 4 and the potential difference (=MH voltage−Low voltage) between the signal electrode 4 and the scanning electrode 5 is expressed as High voltage−MH voltage<MH voltage−Low voltage. Accordingly, in the pixel where the MEI voltage is applied to the signal electrode 4, the conductive liquid 16 is positioned on the scanning electrode 5 side because the potential difference is larger.

As described above, when the multiple voltages of two or more values are applied to the signal electrodes 4, the colors of the pixels can be changed at multiple levels. In other words, the image display apparatus 1 can perform the gradation display by controlling the signal voltage Vg. Thus, the display device 10 can achieve excellent display performance. In the above description, a voltage within the range of the selected voltage to the non-selected voltage is applied to the signal electrodes 4. However, a voltage outside this range also can be applied to the signal electrodes 4 as the signal voltage Vg. Moreover, although the signal driver 7 changes the magnitude of the signal voltage Vg based on the external image input signal, it may change, e.g., the waveform of the signal voltage Vg. That is, the signal driver 7 may change the signal voltage Vg based on the external image input signal.

In the display device 10 of this embodiment having the above configuration, the signal electrodes (first electrodes) 4 are provided on the upper substrate (first substrate) 2 so as to come into contact with the conductive liquid 16. Moreover, the material that is electrochemically inert to the conductive liquid 16 is used for the signal electrodes 4. Therefore, unlike the conventional example, it is possible to prevent the occurrence of an electrochemical reaction between the conductive liquid and the electrodes. Consequently, the display device 10 of this embodiment can prevent a reduction in the reliability and have a long life even if the responsibility of the conductive liquid 16 is improved.

In the image display apparatus (electric apparatus) 1 of this embodiment, the display device 10 is used in the display portion. Therefore, it is possible to easily provide an image display apparatus inducting a long-life display portion with excellent reliability and display performance.

In the display device 10 of this embodiment, the plurality of scanning electrodes (second electrodes) 5 and the plurality of reference electrodes (third electrodes) 6 are alternately arranged on the lower substrate (second substrate) 3 so as to intersect with the plurality of signal electrodes 4. Moreover, in the display device 10 of this embodiment, the signal driver (signal voltage application portion) 7, the scanning driver (scanning voltage application portion) 8, and the reference driver (reference voltage application portion) 9 apply the signal voltage, the scanning voltage (the selected voltage or the non-selected voltage), and the reference voltage to the signal electrodes 4, the scanning electrodes 5, and the reference electrodes 6, respectively. Thus, this embodiment can provide a long-life matrix-driven display device with excellent reliability.

In the display device 10 of this embodiment, since the display operation is performed using the illumination light emitted from the backlight 18, a proper display operation can be performed even with insufficient ambient light or at nighttime. Moreover, this embodiment can easily provide a high brightness display device that has a large dimming range and is readily capable of performing a high precision gradation control.

[Embodiment]2

Figure 6A:
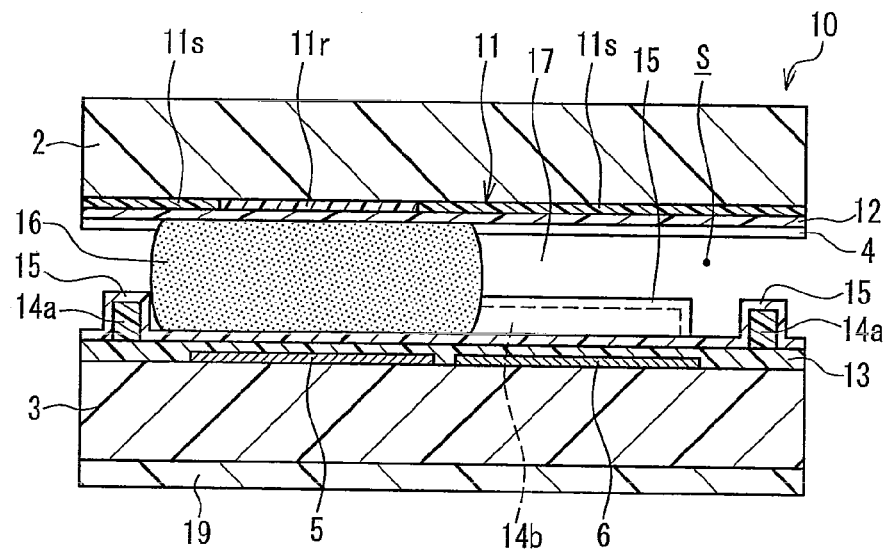
FIGS. 6A and 6B are cross-sectional views showing the main configuration of a display device of Embodiment 2 of the present invention during non-CF color display and CF color display, respectively.
Figure 6B:
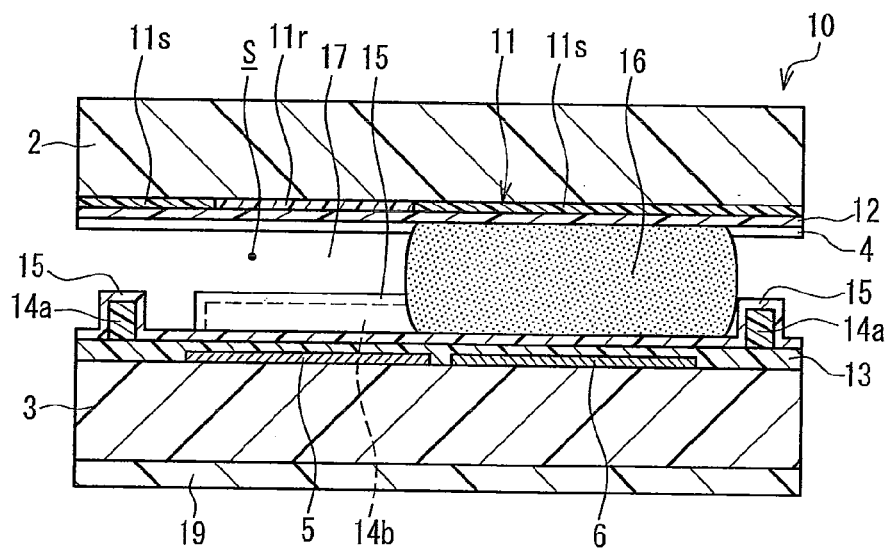

FIGS. 6A and 6B are cross-sectional views showing the main configuration of a display device of Embodiment 2 of the present invention during non-CF color display and CF color display, respectively In the figures, this embodiment differs from Embodiment 1 mainly in that a reflection type display device is configured by providing a diffuse reflection plate on the back of the lower substrate. The same components as those of Embodiment 1 are denoted by the same reference numerals, and the explanation will not be repeated.

As shown in FIG. 6, in this embodiment, a diffuse reflection plate 19 is integrally provided on the back of the lower substrate 3, and thus a reflection type display device 10 is configured. The diffuse reflection plate 19 includes a transparent polymeric resin such as an acrylic resin and a plurality of types of fine particles that are incorporated into the polymeric resin and differ from one another in refractive index. The diffuse reflection plate 19 functions as a light reflection portion for reflecting the ambient light that has entered from the upper substrate 2 side (i.e., the display surface side) back to the display surface side. Moreover, as the plurality of types of fine particles, the diffuse reflection plate 19 includes titanium oxide and alumina fine particles having a large refractive index and hollow polymer fine particles having a small refractive index, thereby effectively reflecting the ambient light to the display surface side.

In the display device 10 of this embodiment, as shown in FIG. 6A, when the conductive liquid 16 is held between the color filter 11*r* and the scanning electrode 5, the ambient light from the display surface side is blocked by the conductive liquid 16, so that the black display (non-CF color display) is performed. On the other hand, as shown in FIG. 6B, when the conductive liquid 16 is held between the black matrix 11*s* and the reference electrode 6, the ambient light from the display surface side is not blocked by the conductive liquid 16, reaches the diffuse reflection plate 19, and is reflected back to the display surface side by the diffuse reflection plate 19. Then, the reflected light passes through the color filter 11*r*, so that the red display (CF color display) is performed.

With the above configuration, this embodiment can have effects comparable to those of Embodiment 1. Moreover, since the diffuse reflection plate (light reflection portion) 19 reflects the externally incident ambient light so as to perform the display operation, this embodiment can easily provide a thin and an electric power-saving display device 10, and the image display apparatus 1.

In the above description, the diffuse reflection plate 19 is provided on the back of the lower substrate 3. However, the present invention is not limited thereto, as long as the light reflection portion is provided on the second substrate that is located on the non-display surface side. For example, when a white plate that is made of a synthetic resin and has a reflection function is used to form the dielectric layer 13, the dielectric layer also can serve as a diffuse reflection plate. Moreover, when such a white plate is used to form the lower substrate 3, the lower substrate also can serve as a diffuse reflection plate.

[Embodiment]3

Figure 7A:
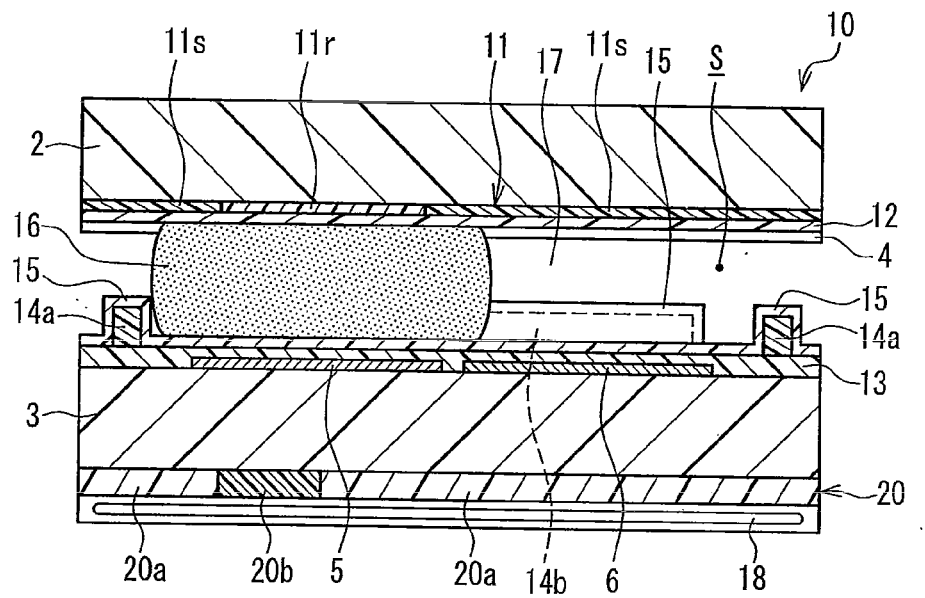
FIGS. 7A and 7B are cross-sectional views showing the main configuration of a display device of Embodiment 3 of the present invention during non-CF color display and CF color display, respectively.
Figure 7B:
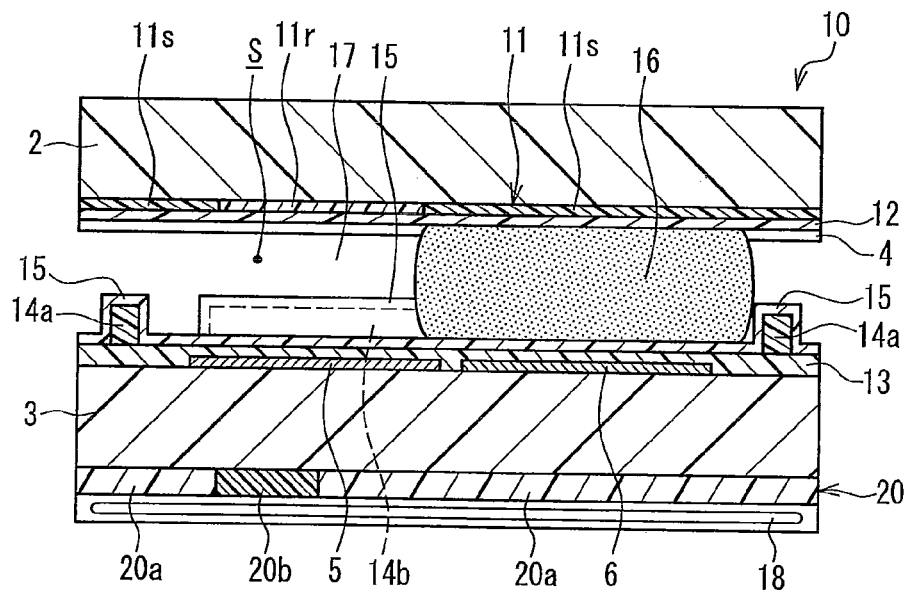

FIGS. 7A and 7B are cross-sectional views showing the main configuration of a display device of Embodiment 3 of the present invention during non-CF color display and CF color display, respectively. In the figures, this embodiment differs from Embodiment 1 mainly in that a semi-transmission type display device is configured by providing a semi-transmission plate on the back of the lower substrate. The semi-transmission plate has a diffuse reflection portion and a transparent portion that are arranged side by side. The same components as those of Embodiment 1 are denoted by the same reference numerals, and the explanation will not be repeated.

As shown in FIG. 7, in this embodiment, a semi-transmission plate 20 is integrally provided on the back of the lower substrate 3, and thus a semi-transmission type display device 10 is configured. The semi-transmission plate 20 has a transparent portion 20a and a diffuse reflection portion 20b (serving as a light reflection portion) that are arranged side by side in the lateral direction of FIG. 7. Specifically, the transparent potion 20a and the diffuse reflection portion 20b are provided on the surface of the back of the lower substrate 3 so as to divide the effective display region P1 (FIG. 2) of the pixel into two parts. The transparent portion 20a is made of, e.g., a transparent synthetic resin such as an acrylic resin and allows the illumination light from the backlight 18 to pass through it. Like the diffuse reflection plate 19 in FIG. 6, the diffuse reflection portion 20b includes a transparent polymeric resin containing a plurality of types of fine particles and serves to diffuse and reflect the ambient light that has entered from the display surface side.

In the display device 10 of this embodiment, as shown in FIG. 7A, when the conductive liquid 16 is held between the color filter 11r and the scanning electrode 5, the ambient light from the display surface side and the illumination light from the backlight 18 are blocked by the conductive liquid 16, so that the black display (non-CF color display) is performed. On the other hand, as shown in FIG. 7B, when the conductive liquid 16 is held between the black matrix 11s and the reference electrode 6, the ambient light from the display surface side is not blocked by the conductive liquid 16, reaches the diffuse reflection portion 20b, and is reflected back to the display surface side by the diffuse reflection portion 20b. Then, the reflected light passes through the color filter 11r. Moreover, the illumination light from the backlight 18 also passes through the color filter 11r. Thus, in the display device 10 of this embodiment, the red display (CF color display) is performed with the ambient light and the illumination light.

With the above configuration, this embodiment can have effects comparable to those of Embodiment 1. Moreover, since the display operation is performed using the ambient light reflected by the diffuse reflection portion (light reflection portion) 20b and the illumination light emitted from the backlight 18, this embodiment can easily provide a high brightness display device 10 that has a large dimming range and is readily capable of performing a high precision gradation control while reducing the power consumption of the backlight 18, and the image display apparatus 1.

In the above description, the semi-transmission plate 20 having the transparent portion 20a and the diffuse reflection portion 20b is provided on the back of the lower substrate 3. However, the present invention is not limited thereto, as long as the light reflection portion and the transparent portion are arranged side by side on the second substrate that is located on the non-display surface side. For example, when a white plate that is made of a synthetic resin, provided with a transparent portion, and has a reflection function is used to form the lower substrate 3, the lower substrate also can serve as a semi-transmission plate.

It should be noted that the above embodiments are all illustrative and not restrictive. The technological scope of the present invention is defined by the appended claims, and all changes that come within the range of equivalency of the claims are intended to be embraced therein.

For example, in the above description, the present invention is applied to an image display apparatus including a display portion that can display color images. However, the present invention is not limited thereto, as long as it is applied to an electric apparatus with a display portion that displays the information including characters and images. For example, the present invention is suitable for various electric apparatuses with display portions such as a personal digital assistant such as an electronic organizer, a display apparatus for a personal computer or television, and an electronic paper.

In the above description, the electrowetting-type display device is used, in which the conductive liquid is moved in accordance with the application of an electric field to the conductive liquid. However, the display device of the present invention is not limited thereto, as long as it is an electric-field-induced display device that can change the display color on the display surface by moving the conductive liquid in the display space with the use of an external electric field. For example, the present invention can be applied to other types of electric-field-induced display devices such as an electroosmotic type, an electrophoretic type, and a dielectrophoretic type.

As described in each of the above embodiments, the electrowetting-type display device is preferred because the conductive liquid can be moved at a high speed and a low chive voltage. Thus, the electrowetting-type display device can easily improve the switching speed of the display color on the display surface and achieve the electric power saving. This can facilitate the dynamic image display and provide a display device with excellent display performance. In the electrowetting-type display device, the display color is changed with the movement of the conductive liquid. Therefore, unlike a liquid crystal display apparatus or the like, there is no viewing angle dependence. Moreover, since a switching device does not need to be provided for each pixel, a high-performance matrix-driven display device having a simple structure can be achieved at a low cost. Further, the electrowetting-type display device does not use a birefringent material such as a liquid crystal layer. Therefore, it is possible to easily provide a high brightness display device with excellent utilization efficiency of light from the backlight or ambient light used for information display.

In the above description, the conductive liquid is a potassium chloride aqueous solution, and the signal electrodes (first electrodes) include at least one of gold, silver, copper, platinum, and palladium. However, the present invention is not limited thereto, as long as a material that is electrochemically inert to the conductive liquid is used for the first electrodes that come into contact with the conductive liquid. Specifically, the conductive liquid can be, e.g., a material including an electrolyte such as a zinc chloride, potassium hydroxide, sodium hydroxide, alkali metal hydroxide, zinc oxide, sodium chloride, lithium salt, phosphoric acid, alkali metal carbonate, or ceramics with oxygen ion conductivity. The solvent can be, e.g., an organic solvent such as alcohol, acetone, formamide, or ethylene glycol other than water. The conductive liquid of the present invention also can be an ionic liquid (room temperature molten salt) including pyridine-, alicyclic amine-, or aliphatic amine-based cations and fluorine anions such as fluoride ions or triflate.

As described in each of the above embodiments, the aqueous solution in which a predetermined electrolyte is dissolved is preferred for the conductive liquid because the display device can have excellent handling properties and also be easily produced.

The first electrodes of the present invention may be in the passive state including an electrode body composed of a conductive metal such as aluminum, nickel, iron, cobalt, chromium, titanium, tantalum, niobium, or an alloy thereof and an oxide film disposed to cover the surface of the electrode body.

As described in each of the above embodiments, the first electrodes including at least one of gold, silver, copper, platinum, and palladium are preferred because these metals have a low ionization tendency and make it possible not only to simplify the first electrodes, but also to reliably prevent an electrochemical reaction between the first electrodes and the conductive liquid. Thus, the display device can easily prevent a reduction in the reliability and have a long life. Moreover, with the use of the metals having a low ionization tendency, the interfacial tension at the interface between the first electrodes and the conductive liquid can be relatively small. Therefore, when the conductive liquid is not moved, it can be easily held in a stable state at the fixed position.

In the above description, the signal electrodes (first electrodes) are provided on the upper substrate (first substrate), while the scanning electrodes (second electrodes) and the reference electrodes (third electrodes) are provided on the lower substrate (second substrate). However, the present invention is not limited thereto, as long as the first electrodes are provided on one of the first substrate and the second substrate so as to come into contact with the conductive liquid, and the second and third electrodes are provided on the other of the first substrate and the second substrate so as to be electrically insulated from the conductive liquid and each other. That is, the first electrodes may be provided on the second substrate, and the second and third electrodes may be provided on the first substrate. Other than the above description, the signal electrodes may be provided on one of the first substrate and the second substrate as the second or third electrodes, and the scanning electrodes may be provided on the other of the first substrate and the second substrate as the first electrodes.

In the above description, the scanning electrodes (second electrodes) and the reference electrodes (third electrodes) are made of transparent electrode materials. However, the present invention is not limited thereto, as long as either one of the second electrodes and the third electrodes, which are arranged to face the effective display regions of the pixels, are made of the transparent electrode materials. The other electrodes that do not face the effective display regions can be made of opaque electrode materials such as aluminum, silver, chromium, and other metals.

In the above description, the scanning electrodes (second electrodes) and the reference electrodes (third electrodes) are in the form of stripes. However, the shapes of the second and third electrodes of the present invention are not limited thereto. For example, the reflection type display device may use linear or mesh electrodes that are not likely to cause a light loss, since the utilization efficiency of light used for information display is lower in the reflection type display device than in the transmission type display device.

In the above description, the signal electrodes (first electrodes) are linear wiring. However, the first electrodes of the present invention are not limited thereto, and can be wiring with other shapes such as mesh wiring.

As described in each of the above embodiments, it is preferable that the shape of the first electrodes is determined using the transmittance of the second and third electrodes that are transparent electrodes. This is because even if the first electrodes are made of an opaque material, shadows of the first electrodes can be prevented from appearing on the display surface, and thus a decrease in display quality can be suppressed. The use of the linear wiring is more preferred because the decrease in display quality can be reliably suppressed.

In the above description, the scanning electrodes (second electrodes) and the reference electrodes (third electrodes) are provided on the surface of the lower substrate (second substrate) that faces the display surface side. However, the present invention is not limited thereto, and can use the second and third electrodes that are buried in the second substrate made of an insulating material. In this case, the second substrate also can serve as a dielectric layer, which can eliminate the formation of the dielectric layer.

In the above description, the nonpolar oil is used However, the present invention is not limited thereto. For example, air may be used instead of the oil, as long as it is an insulating fluid that is not mixed with the conductive liquid. Moreover, silicone oil or an aliphatic hydrocarbon also can be used as the oil.

As described in each of the above embodiments, the nonpolar oil that is not compatible with the conductive liquid is preferred because the droplets of the conductive liquid move more easily in the nonpolar oil compared to the use of air and the conductive liquid. Consequently, the conductive liquid can be moved at a high speed, and the display color can be switched at a high speed.

In the above description, the black colored conductive liquid and the color filter layer are used to form the pixels of R, G, and B colors on the display surface side. However, the present invention is not limited thereto, as long as a plurality of pixel regions are provided in accordance with a plurality of colors that enable full-color display to be shown on the display surface. Specifically, the conductive liquids with different colors such as RGB, CMY composed of cyan (C), magenta (M), and yellow (Y), or RGBYC also can be used.

Figure 8A:
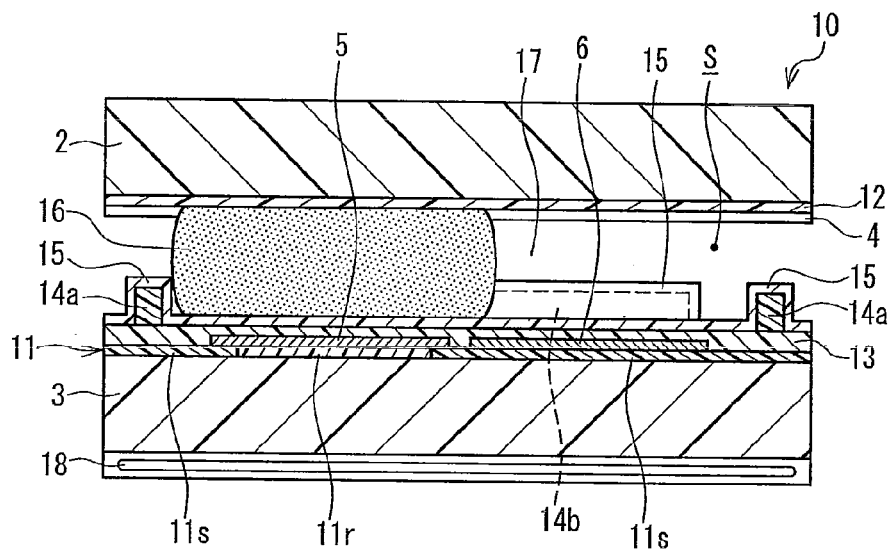
FIGS. 8A and 8B are cross-sectional views showing the main configuration of a modified example of the display device in FIG. 1 during non-CF color display and CF color display, respectively.
Figure 8B:
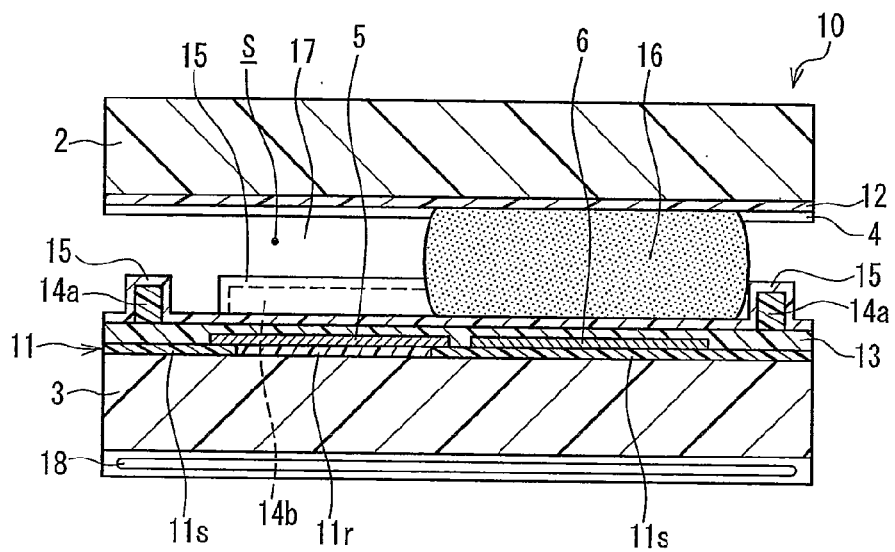

In the above description, the color filter layer is formed on the surface of the upper substrate (first substrate) that faces the non-display surface side However, the present invention is not limited thereto, and the color filter can be formed on the surface of the first substrate that faces the display surface side or on the lower substrate (second substrate). Specifically, as shown in FIGS. 8A and 8B, the color filter layer 11 may be formed on the surface of the lower substrate (second substrate) 3 that faces the display surface side. Thus, the color filter layer is preferred compared to the use of the conductive liquids with different colors because the display device can be easily produced.

INDUSTRIAL APPLICABILITY

The present invention is useful for a long-life display device that can prevent a reduction in the reliability even if the responsibility of a conductive liquid is improved, and an electric apparatus using the display device.

The invention claimed is:

1. A display device that comprises a first substrate provided on a display surface side, a second substrate provided on a non-display surface side of the first substrate so that a predetermined display space is formed between the first substrate and the second substrate, and a conductive liquid movably sealed in the display space, and that is capable of changing a display color on the display surface side by moving the conductive liquid, wherein the display device comprises:
a first electrode that is provided on one of the first substrate and the second substrate so as to come into contact with the conductive liquid;
a second electrode that is provided on the other of the first substrate and the second substrate so as to be electrically insulated from the conductive liquid; and
a third electrode that is provided on the other of the first substrate and the second substrate so as to be electrically insulated from the conductive liquid and the second electrode, and
wherein the first electrode is made of a material that is electrochemically inert to the conductive liquid, and
wherein a plurality of the first electrodes are provided along a predetermined arrangement direction,
a plurality of the second electrodes and a plurality of the third electrodes are alternately arranged so as to intersect with the plurality of the first electrodes,
the plurality of the first electrodes are used as one of a plurality of signal electrodes and a plurality of scanning electrodes,
the plurality of the second electrodes are used as the other of the plurality of the signal electrodes and the plurality of the scanning electrodes, and
the plurality of the third electrodes are used as a plurality of reference electrodes, and
wherein the display device comprises:
a reference voltage application portion that is connected to the plurality of the reference electrodes and applies a predetermined reference voltage to each of the reference electrodes;
a signal voltage application portion that is connected to the plurality of the signal electrodes and applies a signal voltage to each of the signal electrodes in accordance with information to be displayed on the display surface side; and
a scanning voltage application portion that is connected to the plurality of the scanning electrodes and applies one of a non-selected voltage and a selected voltage to each of the scanning electrodes while the reference voltage application portion applies the reference voltage to each of the reference electrodes, the non-selected voltage inhibiting a movement of the conductive liquid in the display space and the selected voltage allowing the conductive liquid to move in the display space in accordance with the signal voltage.

2. The display device according to claim 1, wherein a plurality of pixel regions are provided on the display surface side,
the plurality of the pixel regions are located at each of the intersections of the signal electrodes and the scanning electrodes, and
the display space in each of the pixel regions is partitioned by a partition.

3. The display device according to claim 2, wherein the plurality of the pixel regions are provided in accordance with a plurality of colors that enable full-color display to be shown on the display surface side.

4. The display device according to claim 1, wherein the signal voltage application portion changes the signal voltage based on an external image input signal.

5. The display device according to claim 1, wherein an insulating fluid that is not mixed with the conductive liquid is movably sealed in the display space.

6. The display device according to claim 1, wherein a dielectric layer is formed on the surfaces of the second electrode and the third electrode.

7. The display device according to claim 1, wherein the first substrate and the second substrate are made of a transparent sheet material, and
a backlight is provided on a back of the second substrate.

8. The display device according to claim 1, wherein the conductive liquid is an aqueous solution including water as a solvent and a predetermined electrolyte as a solute.

9. The display device according to claim 1, wherein the first electrode is in a passive state including an electrode body composed of a conductive metal and an oxide film disposed to cover the surface of the electrode body.

10. The display device according to claim 1, wherein the first electrode includes at least one selected from the group consisting of gold, silver, copper, platinum, and palladium.

11. The display device according to claim 1, wherein the first electrode is linear wiring.

12. An electric apparatus comprising a display portion that displays information including characters and images,
wherein the display portion comprises the display device according to claim 1.

13. A display device that comprises a first substrate provided on a display surface side, a second substrate provided on a non-display surface side of the first substrate so that a predetermined display space is formed between the first substrate and the second substrate, and a conductive liquid movably sealed in the display space, and that is capable of changing a display color on the display surface side by moving the conductive liquid,
wherein the display device comprises:
a first electrode that is provided on one of the first substrate and the second substrate so as to come into contact with the conductive liquid;
a second electrode that is provided on the other of the first substrate and the second substrate so as to be electrically insulated from the conductive liquid; and
a third electrode that is provided on the other of the first substrate and the second substrate so as to be electrically insulated from the conductive liquid and the second electrode, and
wherein the first electrode is made of a material that is electrochemically inert to the conductive liquid,
wherein at least one of the second electrode and the third electrode is a transparent electrode,
a shape of the first electrode is determined using a transmittance of the transparent electrode.

* * * * *